United States Patent
Booth (10) Patent No.: US 9,705,176 B2
(45) Date of Patent: Jul. 11, 2017

(54) E-Z FIT ANTENNA BASE

(71) Applicant: Barry Booth, Jensen Beach, FL (US)

(72) Inventor: Barry Booth, Jensen Beach, FL (US)

(73) Assignee: Barry Booth, Jensen Beach, FL (US)

( * ) Notice: Subject to any disclaimer, the term of this patent is extended or adjusted under 35 U.S.C. 154(b) by 0 days.

(21) Appl. No.: 14/545,565

(22) Filed: May 20, 2015

(65) Prior Publication Data

US 2015/0340760 A1 Nov. 26, 2015

Related U.S. Application Data

(63) Continuation of application No. 12/154,093, filed on May 20, 2008, now abandoned.

(51) Int. Cl.
| | |
|---|---|
| *H01Q 1/12* | (2006.01) |
| *F16L 3/01* | (2006.01) |
| *F16L 3/12* | (2006.01) |
| *H01Q 1/34* | (2006.01) |

(52) U.S. Cl.
CPC .............. *H01Q 1/1207* (2013.01); *F16L 3/01* (2013.01); *F16L 3/1218* (2013.01); *F16L 3/1226* (2013.01); *H01Q 1/1214* (2013.01); *H01Q 1/1235* (2013.01); *H01Q 1/34* (2013.01)

(58) Field of Classification Search
CPC ...... H01Q 1/34; H01Q 1/1207; H01Q 1/1214; H01Q 1/1235
See application file for complete search history.

(56) References Cited

U.S. PATENT DOCUMENTS 5,417,178 A * 5/1995 Harrelson, II ........... H01Q 1/34
114/343

FOREIGN PATENT DOCUMENTS

IT         EP 1375256 A2 * 1/2004 ............. B60R 13/06

* cited by examiner

*Primary Examiner* — Hoang Nguyen

(57) ABSTRACT

An apparatus for securing an antenna to a surface by means of an antenna base and stand off with internal cable routing, which prevents any cables showing. With only one drilled hole at time of installation. With a device for holding an antenna vertical yet allowing said antenna to be lowered easily and quickly without tools or clumsy mechanisms attached to the antenna. A unique way to eliminate water penetration by means of clamping into the surface with gaskets and o-rings in a simple, relatively unskilled process. Therefore eliminating troublesome holes and sharp protrusions made by screws. While allowing free movement of the antenna for raising and lowering prepossess. A one hole, one nut installation that can be preformed by a single relatively unskilled person. Simple to manufacture with a minimal number of parts. With a beautiful streamlined appearance, that can be used for mounting any standard antenna.

10 Claims, 6 Drawing Sheets

E-Z FIT ANTENNA BASE

CROSS REFERENCE TO RELATED APPLICATIONS

This is a continuation of Ser. No. 12/154,093, filed on May 20, 2008.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of marine electronics and more specifically to EZ fit antenna base. An apparatus to secure and standard antenna to a surface without any visible cabling.

This invention relates generally to the field of marine electronics and more specifically to to EZ fit antenna base, which is an apparatus for securing an antenna or similar object to a surface, allowing for multi dimensional movement for lowering and raising purposes and to clear obstacles protruding from the boat or any other object installed upon. For many years antenna mounts have been used, especially in the marine industry for attaching an antenna to a surface, usually the side or top surface of a boat.

The antenna mount allows for a certain amount of movement as stated above, but also to allow the antenna to be lowered for passing under bridges or other obstacles, while on the water or being towed behind a vehicle on a road. although they have changed slightly in design over the years they are still basically the same as they have always been, which was perfectly acceptable in the beginning of radio technology as they were only used on commercial vessels where appearance, difficulty of installation and water tightness were of little or no importance.

However in today's luxury and leisure boat industry the need for a more hi-tech look, ease of installation, ease of usage and safety issues have encouraged me to invent a new kind of antenna mount, the EZ fit antenna system. The complete package for any boat.

As most existing mounts are rectangle based in shape they are difficult to be made to look aesthetic against the curvature in design of most modern boats. Also all prior technology is externally cabled, which apart from being a trip hazard, allows the harsh marine environment to damage the external portions of cable in a very short length of time, together with at least four extra holes through the vessel where the cable enters plus three more unnecessary holes and protrusions causing potential water penetration areas and hazardous sharp protrusions that can harm anybody reaching into hidden but useful storage areas of the vessel, not to mention damage to articles being stored therein.

The use of screws or nuts and bolts to hold the prior technology adds to unsightly appearance especially as these items appear to rust or corrode more aptly in harsh environment, even if they are stainless steel. As all technicians point out to owners "its stain-less steel", not "stain free steel". The heads of screws are easily damaged during the installation process, giving them sharp edges and unsightly appearance, not to mention helping the tarnishing process to start.

Prior technology is also difficult to adjust with ratchet like mechanisms that easily jam, clumsy appearance and ugly looking attachments that stay on the antenna at all times.

I am a marine technician who has installed hundreds if not thousands of antennas over the years, and I have always been disappointed that a beautiful hi tech sleek antenna is mounted to a magnificent piece of marine architecture with such an antiquated and clumsy embodiment. The prior technology involves drilling at least eight holes through the surface of the vessel in question, four for the antenna mount itself, one for the cable to pass through at the side of the antenna mount, and the another three for the bushing to conceal the hole for the cable, all these hole are sealed with caulk, and often spring leaks, damaging the internal surfaces of the boat. I have had to confront this damage on many occasion, as any boat owner would confirm.

Also the screws that hold this apparatus in position often come loose with age and vibration, especially in fiberglass boats, causing even greater leaks and the loss of expensive antennas under way, which is a hazard in itself because of lost communication to shore, damage to the vessel due to whipping effect, and the danger in rough seas (when this usually happens) trying to secure ore remove the whipping antenna.

My invention addresses and prevents all the above deficiencies, as well as streamlining the appearance, concealing all cabling and makes for a simple yet stronger installation, with only one hole through the surface, no screws, and easily accomplished installation by one relatively unskilled individual.

It also allows for a fast and easy removal and re-install of the antenna for stowage when the boat is not being used, often for long periods of time, the expensive antenna can be stowed inside the boast to keep it in pristine condition and away from the hands of thieves or out of storms and bad weather that can not only rip the antenna off the boat but damage the boat severely by is whipping actions throughout the storm. This would be virtually impossible with existing technology because the antenna cabling is permanently attached through the boat. This invention provides a plug to keep the vessel watertight when antenna is not in place.

BRIEF SUMMARY OF THE INVENTION

The primary object of the invention is To conceal the antenna cable.

Another object of the invention is to provide an elegant uncluttered means of attaching antennas to boats.

Another object of the invention is Ease of installation and ease of use.

Another object of the invention is Added safety when moving around the boat.

A further object of the invention is Works with all existing antennas.

Yet another object of the invention is Completely watertight with single hole installation.

Still yet another object of the invention is Allows most antennas to be easily removed and stowed when not being used for a an extended period.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a device for attaching an antenna to a surface incorporating fully internal cabling, that is no cables exposed externally, said device comprising, a base to hold any standard marine antenna, allowing adequate movement to allow said antenna to be raised and lowered as required, a means to lock said antenna into the upright position, and a stand off apparatus to hold said antenna vertical where required.

In accordance with a preferred embodiment of the invention, there is disclosed a device for attaching an antenna as claimed in claim 1 to adjoin said antenna to the side or top surface of a boat or structure further comprising, a means of internally routing the antenna cabling without compromising the movements essential to lower and raise said antenna and clearing any obstacles on said boat or structure, with a separate stand off mechanism fixed higher on said boat or structure for securing said antenna in an upright position when needed.

In accordance with a preferred embodiment of the invention, there is disclosed a device for attaching an antenna as claimed in claim 1 to mount said antenna to a top or side surface of a boat or structure further comprising, a means of internally routing the antenna cabling so not to be visible externally yet allowing said antenna to be moved from a vertical to horizontal position when required, with a means of locking said antenna in a vertical position with a sleeve.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

Drawing No. 1 shows 6 views of the (side mount) version of the invention.

FIG. 1 is a side view of the outer casing.
FIG. 2 is a side view installed through side of boat.
FIG. 3 is a front view of outer casing before inner post assembly is installed.
FIG. 4 is a front view of the inner post assembly showing variations of movements.
FIG. 5 is a top view of the inner post assembly.
FIG. 5A is a perspective view of the replacement plug.
30 is the antenna mount.
35 Are gaskets to seal out water penetration.
40 Is a backing washer to prevent damage to gasket.
45 Is the nut to secure outer casing in place.
50 Is a circlip to secure inner post assembly inside outer casing.
55 is the inner post assembly.
60 Is the slot to hold the circlip 50 in position.
65 shows some of the positions the inner post assembly is capable of moving.
70 is the plug to replace the inner post assembly when absent.
75 Side of boat.
80 is the outer casing.
85 Are the rivets to loosely secure antenna mount 30 to inner post assembly 55.
90 Are the O-ring seals.

Drawing No. 2 and Drawing No. 3 show 5 views of the (top mount) version of the invention.

FIG. 9 shows installed antenna mount in upright position on slopping surface.
FIG. 10 shows installed antenna mount in lowered position on slopping surface
105 is the outer sleeve that locks the antenna in the upright position.
110 is the antenna mount upper section.
115 Shows the alternate position of the antenna mount upper 110.
120 is the antenna mount lower section.
125 is the cone base that allows the antenna to be installed vertically even on a sloping surface.
130 Are a number of soft rubber gaskets to prevent water leakage or slippage when parts are tightened together.
135 Shows the oversize aperture in the cone base 125 that allows installation adjustment for vertical correctness.
145 Is the threaded inner spline that secures the parts above the mounting surface to the parts below the mounting surface.
150 Are the adjustment wedges that allow vertical alignment to a curved or slopping surface.
155 Is the securing nut that locks all parts into place.
160 Shows the hidden internal aperture that conceals the antenna cable.
165 Is the rivet that holds antenna mount lower to antenna mount upper.
170 Is the slot to hold the O-ring Drawing No. 4 and Drawing No. 5 show 6 views of the EZ fit antenna stand off for use in conjunction with with (side mount) antenna base FIG. 11 Is the side view of the stand off version with soft insert.
FIG. 16 is the top view of the stand off version with outward orientation
210 Is the holding ring that secures the antenna high up on the boat.
215 Is the holding gate that opens and closes to keep the antenna in the holding ring
220 Is the gate stop that stops the holding gate 215 or 245 from going too far down, There are two locations so apparatus can be reversed.
225 Is the oval stem that can be cut to length to ensure antenna is vertical and joins the holding ring 210 to the stand off base.
230 Is the hinge pin that allows the holding gate to open and close.
235 Is the soft insert that compresses and forces the antenna against the holding gate 215 or 245 and locks it in a closed position.
240 Are the adjusting plungers that can be used in place of the soft insert 235.
245 Is the holding gate with adjusting plunger 240.
250 Are the soft springy caps that protect the antenna from the adjusting plunger 240.

Drawing No. 6 shows 3 views of various designs of mounting methods for the EZ Fit antenna stand off FIG. 17 Is the top view of oval stem 225 attached to the holding ring 210.

FIG. 18 Are various top and face views of devices that hold the oval stem 225 to a surface.

FIG. 19 Is a top and front view of a direct mount that holds the oval stem 225 to a surface.

205 Is a fixing plate to hold the oval stem 225 to an upper surface of the boat, usually The flybridge top.

210 is the holding ring that secures the antenna high up on the boat.

225 Is the oval stem that can be cut to length to ensure antenna is vertical and joins the holding ring 210 to the stand off base.

230 Is the hinge pin that allows the holding gate 215 or 245 to open and close.

235 Is the soft insert that compresses and forces the antenna against the holding gate 215 or 245 and locks it in a closed position.

255 Are threaded holes to accept alien type screws to lock parts together.

260 Are the alien type screws.

265 Are fixing stubs to hold base type 285 to upper surface of boat, usually the flybridge top.

270 Shows a mounting surface usually vertical and not horizontal as shown on drawing for this application.

275 Shows countersunk holes to accept screws or nuts and bolts for securing to a surface.

280 Shows a slot to accept an allen screw.

285 Shows a stand off base to be used in conjunction with fixing stubs 265.

290 Is a stand off base with flange fixing method.

295 is another possible design of stand off base with flange fixing method.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

This invention is an apparatus for securing an antenna, or similar stick like electronic device or object to a surface, usually a boat, but not limited to marine use. Said surface 75 or 270 could be on any structure or body. Usually constructed in metal, such as stainless steel, alloy, brass or bronze and can be chrome plated, powder coated, painted or anodized. Construction is not limited to metal and could also be in any other materials and finishes deemed fit for construction such as plastic type materials. soft rubber type materials would normally be used for gaskets, seals and O-rings. The apparatus would usually consist of several of the above materials in its manufacture.

Said apparatus to be known as "the antenna mount" from this point forward. The antenna mount is designed as three main parts, the side mount (drawing no. 1), the top mount (drawing no's. 2 & 3) and the stand off (drawing no's. 4, 5 & 6). The top mount being capable of supporting any standard boat antenna in a vertical or horizontal position by itself as in prior technology but with concealed cabling, single hole installation, infinite vertical alignment and no clumsy protruding lever mechanism for locking in the upright position. The side mount would normally be used in conjunction with the stand off, the antenna mount being mounted to the side of the vessel, usually the side of the flybridge and the stand off mounted on the flybridge top or tuna tower if applicable.

Figures 1, 2, 3, 4, 5, 5A:
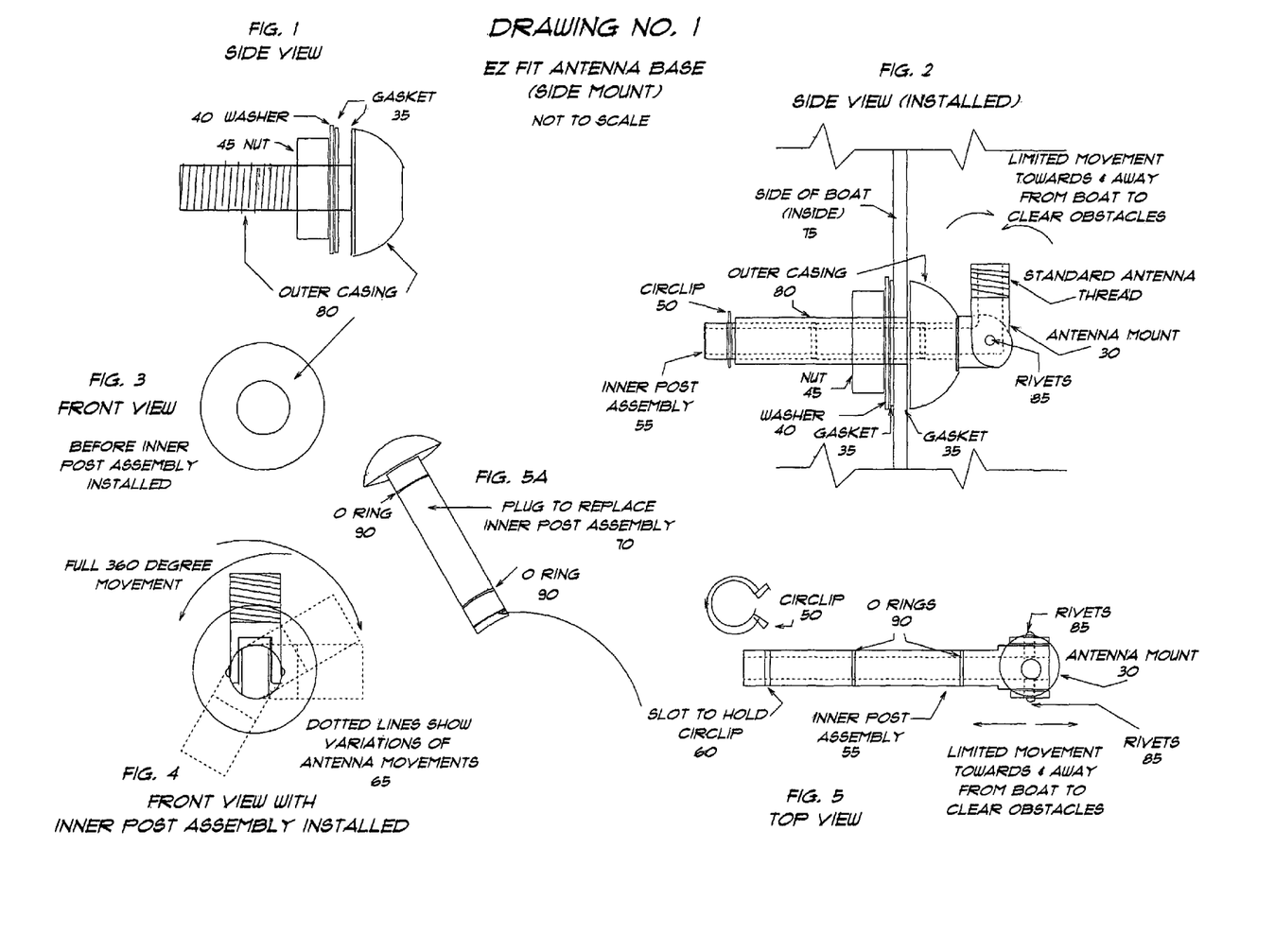

Drawing No. 1 deals with the EZ fit antenna base (side mount). FIG. 1 is the side view of the outer casing 80 which is secured through a single hole drilled in the side of a boat by a nut 45 and washer 40, with two soft rubber gaskets 35 to seal out water. The outer casing once secured in place can be left installed with or without the other parts coupled to the antenna and the boat can be made watertight in their absence by inserting the plug 75 shown in FIG. 5A complete with its O-rings 70. Any standard antenna can then be screwed onto the antenna mount 30 part of the inner post assembly 55 FIG. 5 with the cable from the antenna passing through the center of the antenna mount 30 and the inner post assembly 55, the antenna mount 30 part loosely attached (to allow movement) to the inner post assembly by rivets 85. The inner post assembly with any standard antenna attached can then be inserted into the already installed outer casing 80 and secured in place by a circlip 50, located in the slot 60, the O-rings 70 provide a water seal yet allow for a 360 degree movement 65 FIG. 4, while the rivets 85 allow for some movement towards and away from the boat to clear obstacles. FIG. 2 shows side view of the EZ fit antenna base (side mount) in its entirety, installed through side of boat 75.

Figures 6, 7, 8:
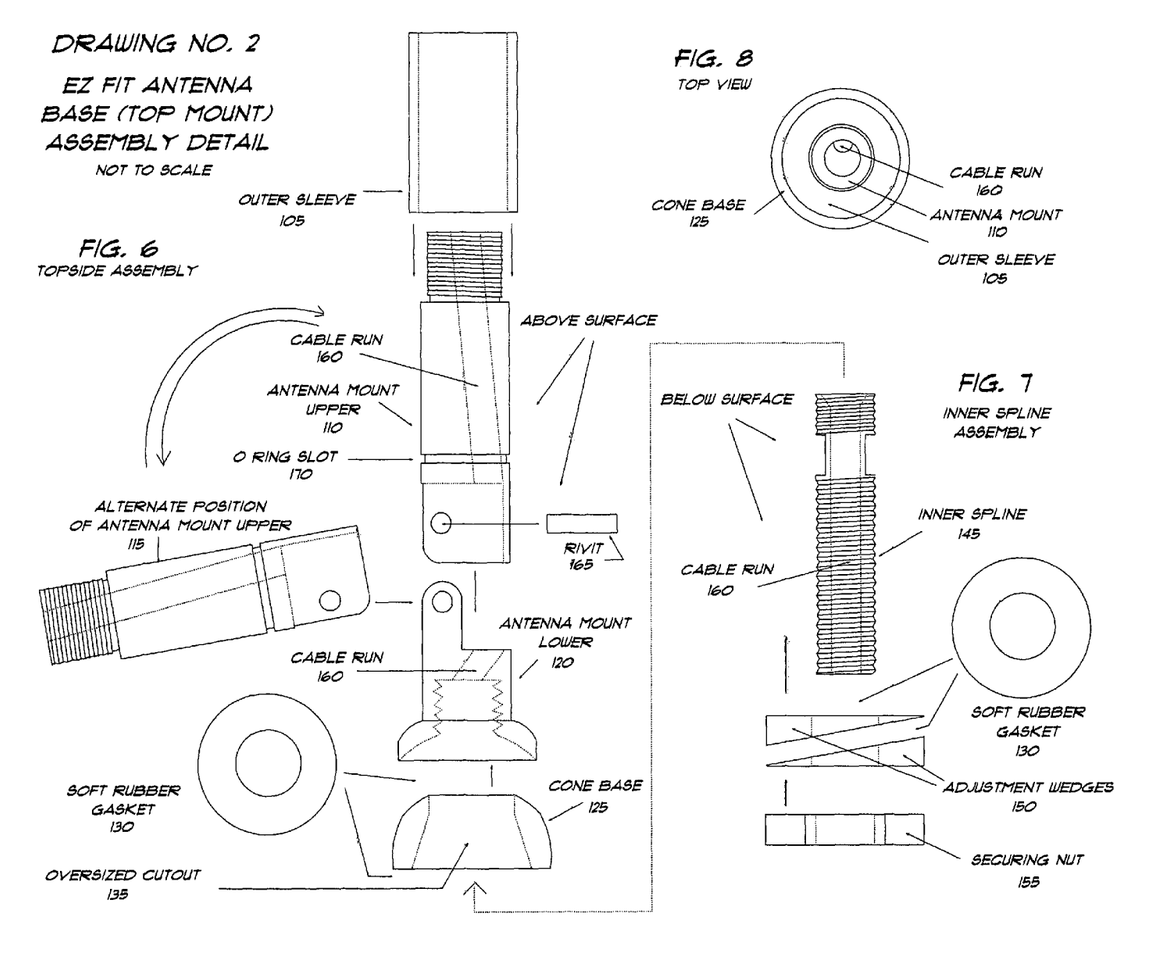
FIG. 6 is an exploded view of the topside assembly of the invention.
FIG. 7 is an exploded view of the inner spline assembly.
FIG. 8 is a top view showing the aperture for the internal cable run.

Drawing No. 2 shows the EZ fit antenna base (top mount), FIG. 6 shows the topside assembly which is a cone base 125 with its oversized cutout 135 depicted by dotted lines which allow a vertical antenna position even on a sloping surface, the use of the two soft rubber gaskets 130 ensure a watertight application and slippage problems when tightened in place. The antenna mount lower 120 sits on top of the cone base 125 but allows for unlimited vertical adjustments, then the antenna mount upper 110 joins the antenna mount lower 120 by means of a rivet or pin which allows it to be 90 degrees or more as shown in alternate position 115. The antenna mount upper 110 can be locked into vertical position by sliding the outer sleeve 105 downwards and over the antenna mount lower 120, an O-ring located into the O-ring slot 175 prevents water penetration and takes up the looseness in the outer sleeve 105. FIG. 7 shows the inner spline assembly, the inner spline 145 is a hollow rod threaded on the outside that passes through a drilled hole in the top surface of a boat, it then threads into the antenna mount lower 120 and secures the topside assembly FIG. 6 to the mounting surface by means of a securing nut 155 and two wedge shaped washers called adjustment wedges 150. Rotating the adjustment washers 150 while tightening allows infinite angles to ensure vertical installation of the antenna, the soft rubber gaskets 130 allow for a watertight application and prevent slippage when fully tightened. FIG. 8 is a top view showing the cable run 160, the cable run 160 is also shown in FIG. 6 and FIG. 8 with dotted lines and allows for the cabling from the antenna to be concealed internally.

Figures 9, 10:
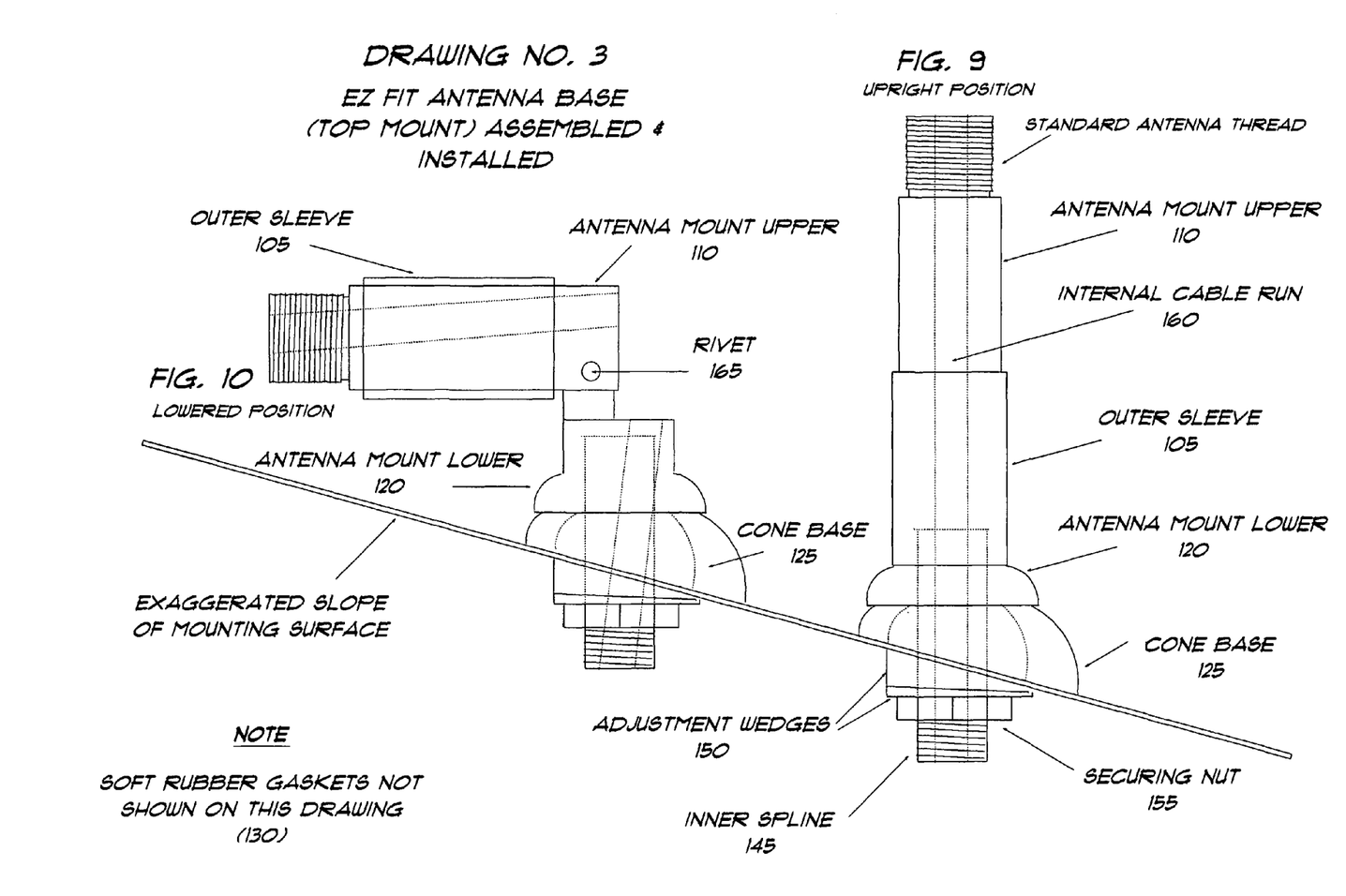

Drawing No. 3 shows the EZ fit antenna base (top mount) assembled and installed through a surface 180, FIG. 9 showing the vertical position and FIG. 10 showing the lowered position.

The EZ fit antenna base allows for complete concealment of any cables, unlike any prior art where the cable exits the side of the actual antenna before reaching the mount and forming a large loop that acts as a water drip (and trip hazard) and then enters the side of the boat through another large hole plus several fixing screw holes, all potential leak areas. All prior art relies on a minimum of eight holes drilled through the boats surface at installation and caulk to prevent leaks, whereas the EZ fit antenna base needs just one single hole and uses clamping and gaskets to totally prevent leaks.

Figure 11:
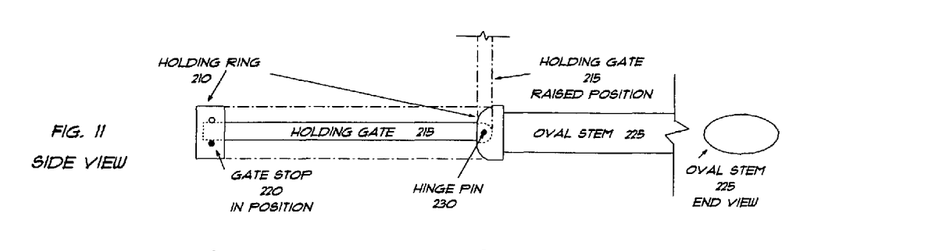
Figure 12:
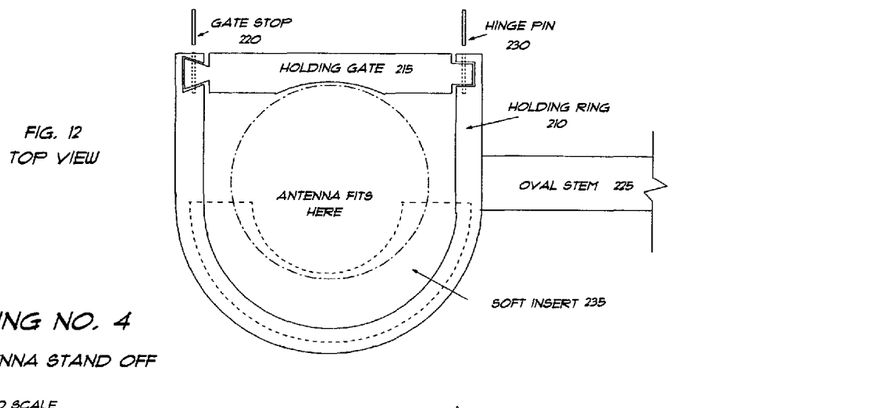
FIG. 12 Is the top view of the stand off version with soft insert.
Figure 13:
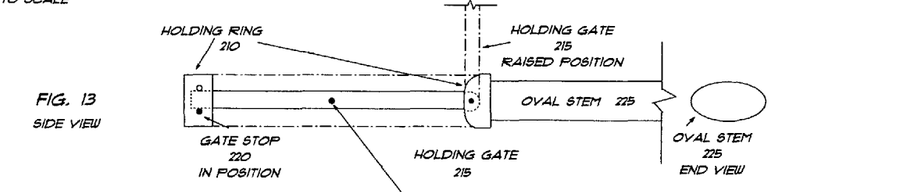
FIG. 13 is the side view of the stand off version with adjusting plungers.
Figure 14:
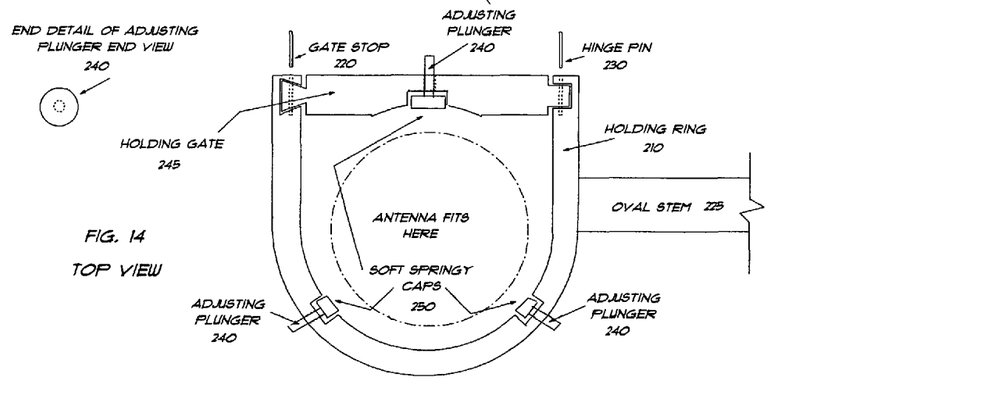
FIG. 14 is the top view of the stand off version with adjusting plungers.
Figure 15:
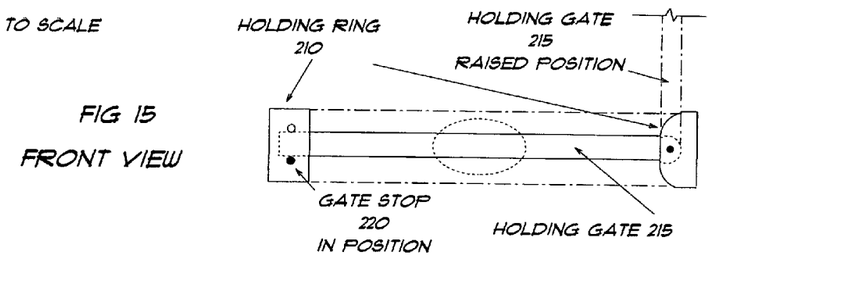
FIG. 15 is the side view of the stand off version with outward orientation
Figure 16:
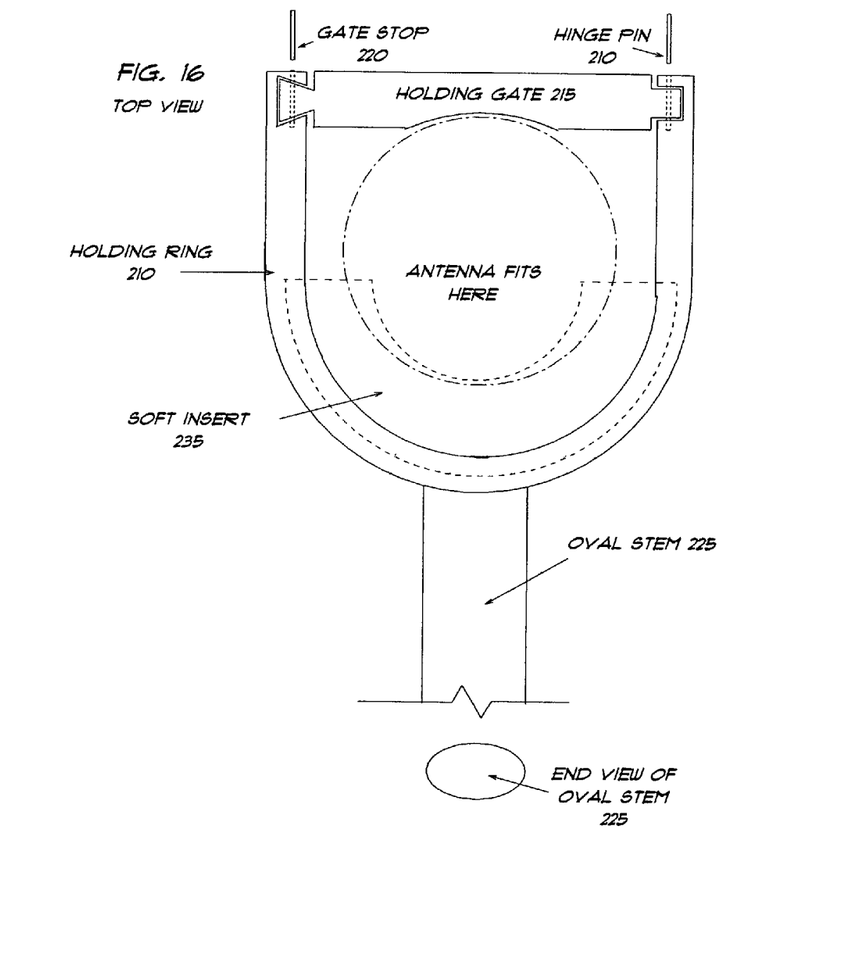

Drawing No. 4 is the EZ fit antenna stand off to be used in conjunction with the EZ fit antenna base (side mount) as the means to hold the antenna in a vertical position. It differs from prior art because it holds a standard antenna by means of a soft springy inserts 235 & 250 that press the antenna against the holding gate 215 and therefore locking the holding gate in place when closed by means of a curved dovetail end that cannot lift when under pressure, prior art relies on clumsy and unsightly attachments that stay on the antenna at all times or by mechanical means that are difficult to tighten and release especially when they age. FIG. 11 is a side view that shows the holding gate 215 down (and up, dotted lines) The gate stop 220 prevents the holding gate 215 from passing through, while the other hole can hold the gate stop 220 if used on the opposite side of boat, making each stand off left or right handed. The oval stem would be supplied over length to allow the installer to cut to obtain vertical alignment. FIG. 12 is a top view and shows approximate location of antenna and the soft insert 235 that protects the antenna and forces it into the holding gate 215 that prevents the holding gate 215 from lifting when underway. The holding gate uses a hinge pin 230 for a minimum 180 degree movement. the holding ring 210 is permanently fixed to one end of the oval stem 225, which could also be round or another shape. FIG. 13 & FIG. 14 show the same as FIGS. 11 & 12 except they use adjusting plungers 240 with soft springy caps 250 in place of the soft insert 235.

Figures 17, 18, 19:
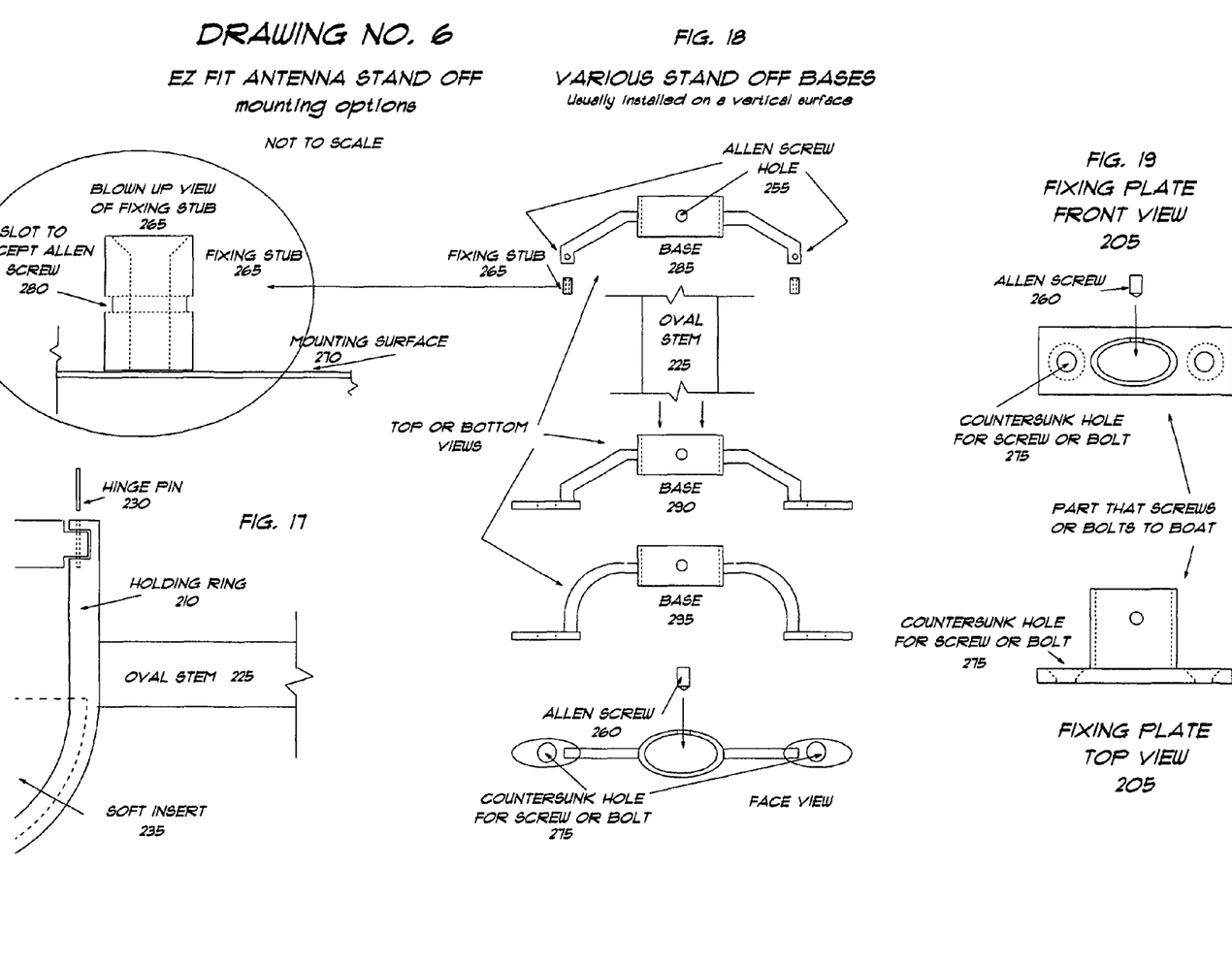

Drawing No. 5 Shows the same as Drawing No. 4 only the antenna moves in from the outside rather than from the front or back Drawing No. 6 shows various types of attachments to hold the oval stem against the boat. In FIG. 18 base 285 uses fixing stubs 265 that attach to the boat independently, then the base attaches to the fixing stubs 265 by an alien screw 260 or similar that locates into the slot 280 for extra security. Bases 290 & 295 are suggested designs and have attached flanges with countersunk holes for screws or bolts 275 as shown in the face view. The oval stem would then fit into base and be held in place by the alien screw 260. FIG. 19 shows a fixing plate 205 instead of bases 285, 290 or 295.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. An antenna attachment device comprising:
    a. an outer casing defined by a shank extending outward from a base, wherein the shank is disposed through an aperture in a surface, and wherein an aperture extends coaxially through the outer casing;
    b. an inner post assembly having a first segment with a first circumference and a second segment with a second circumference, wherein a first circumference is less than a second circumference, and wherein the first segment is disposed through the aperture of the outer casing, and wherein the inner post assembly has a hollow interior;
    c. an antenna mount moveably attached to the second segment, wherein an antenna is threadingly engaged to the antenna mount, wherein the antenna is attached to a wire, wherein the wire extends from a bottom of the antenna entirely within the antenna mount and entirely through the hollow interior of the inner post assembly.

2. The device of claim 1, further comprising a plug, wherein the plug replaces the antenna and inner post assembly when the antenna is removed.

3. The device of claim 1, further comprising a conical base having an aperture and a plurality of wedges, wherein the plurality of wedges allow vertical installation on a top of a boat, and wherein the top is sloped.

4. The device of claim 1, further comprising one or more gaskets disposed between elements of the device, wherein the one or more gaskets create a watertight seal.

5. The device of claim 1, wherein an end of the first segment extends beyond the shank, wherein a slot is disposed between the end of the first segment and the shank, wherein the slot received a clip to retain the inner post assembly within the outer casing.

6. The device of claim 1, wherein the surface is the hull of a boat, wherein the shank and first portion extend into an interior of the hull, and wherein the base and second segment are disposed on an exterior of the hull.

7. The device of claim 6, further comprising at least two gaskets circumferentially engaging the outer casing, wherein one of the at least two gaskets is disposed between the base and the surface, and another of the at least two gaskets.

8. The device of claim 1, wherein the antenna mount pivots about one or more rivets, wherein the one or more rivets attach the antenna mount to the second segment.

9. The device of claim 1, wherein the antenna mount comprises an upper mount and a lower mount, wherein the upper mount and the lower mount allow omnidirectional positioning of the antenna.

10. The device of claim 9, wherein the lower antenna mount is contoured corresponding to the base of the outer casing.

\* \* \* \* \*